(12) United States Patent
Campbell

(10) Patent No.: US 12,326,100 B1
(45) Date of Patent: Jun. 10, 2025

(54) GAS TURBINE ENGINE COMPONENT FILLETS FORMED OF CMC PLIES

(71) Applicant: RTX Corporation, Farmington, CT (US)

(72) Inventor: Christian X. Campbell, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/428,819

(22) Filed: Jan. 31, 2024

(51) Int. Cl.
*F01D 5/28* (2006.01)
*F02C 7/00* (2006.01)

(52) U.S. Cl.
CPC .............. *F01D 5/282* (2013.01); *F02C 7/00* (2013.01); *F05D 2230/20* (2013.01); *F05D 2300/6033* (2013.01)

(58) Field of Classification Search
CPC ........ F01D 5/282; F02C 7/00; F05D 2230/20; F05D 2300/6033
See application file for complete search history.

(56) References Cited

U.S. PATENT DOCUMENTS

| | | | |
|---|---|---|---|
| 10,280,537 | B2 | 5/2019 | Marchal et al. |
| 10,508,559 | B2 | 12/2019 | Gimat et al. |
| 11,035,239 | B2 | 6/2021 | de Diego et al. |
| 11,346,228 | B1 * | 5/2022 | Burdette ................. F01D 9/044 |
| 2012/0301313 | A1 * | 11/2012 | Suciu .................... F01D 25/246 |
| | | | 156/185 |
| 2012/0301315 | A1 * | 11/2012 | Alvanos .................. F01D 5/284 |
| | | | 156/182 |
| 2013/0052030 | A1 * | 2/2013 | McCaffrey .............. F01D 9/041 |
| | | | 416/241 B |
| 2014/0271208 | A1 * | 9/2014 | Garcia-Crespo .......... F01D 5/30 |
| | | | 156/60 |
| 2017/0254212 | A1 * | 9/2017 | Pautard ..................... F01D 9/02 |
| 2018/0094525 | A1 * | 4/2018 | Roberts ................. F04D 29/542 |
| 2020/0232332 | A1 * | 7/2020 | Farrar ..................... F04D 29/54 |
| 2021/0246788 | A1 * | 8/2021 | Sobanski ................ F01D 5/282 |
| 2023/0026977 | A1 * | 1/2023 | Read ..................... F01D 11/005 |

* cited by examiner

Primary Examiner — Steven M Sutherland
(74) Attorney, Agent, or Firm — Carlson, Gaskey & Olds, P.C.

(57) ABSTRACT

A gas turbine engine static vane includes a radially outer platform, a radially inner platform, and an airfoil extending between a leading edge and a trailing edge, and having a suction side and a pressure side. The radially inner and outer platforms and the airfoil all are formed of ceramic matrix composite plies. There are an outer platform fillet and an inlet platform fillet merging the airfoil into the radially outer platform and the radially inner platform and along each of the pressure side and the suction side. The fillets are formed with radially outer ply layers extending from the radially outer platform, through the airfoil, and to the radially inner platform, and radially inner ply layers extending from the radially outer platform, through the airfoil, and to the radially inner platform. The radially outer ply layers and the radially inner ply layers do not cover the entirety of the outer platform, the inner platform or the airfoil. They have edges which overlap each other such that the radially outer ply layers and radially inner ply layers include layers of different shapes. A gas turbine engine and a method are also disclosed.

20 Claims, 13 Drawing Sheets

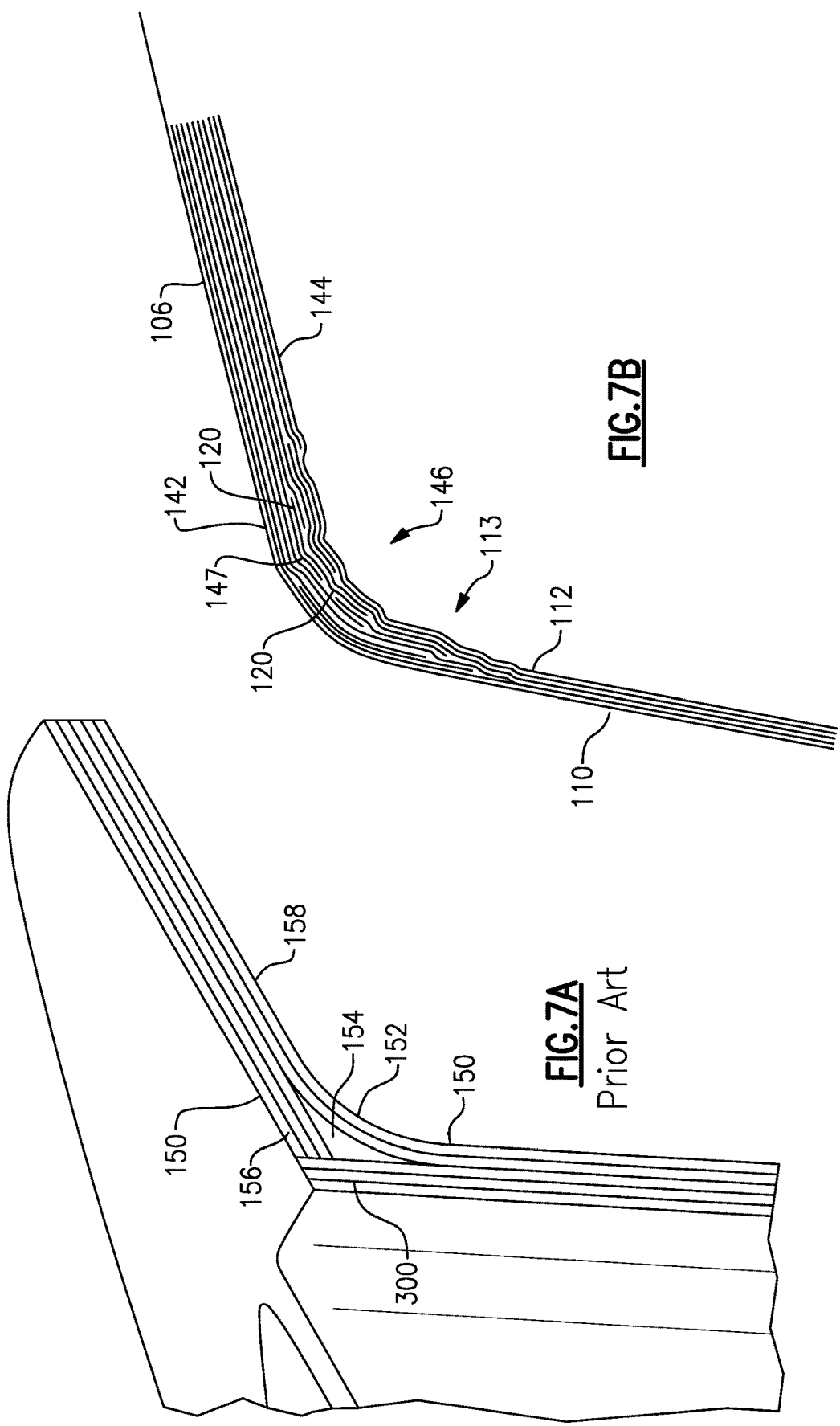

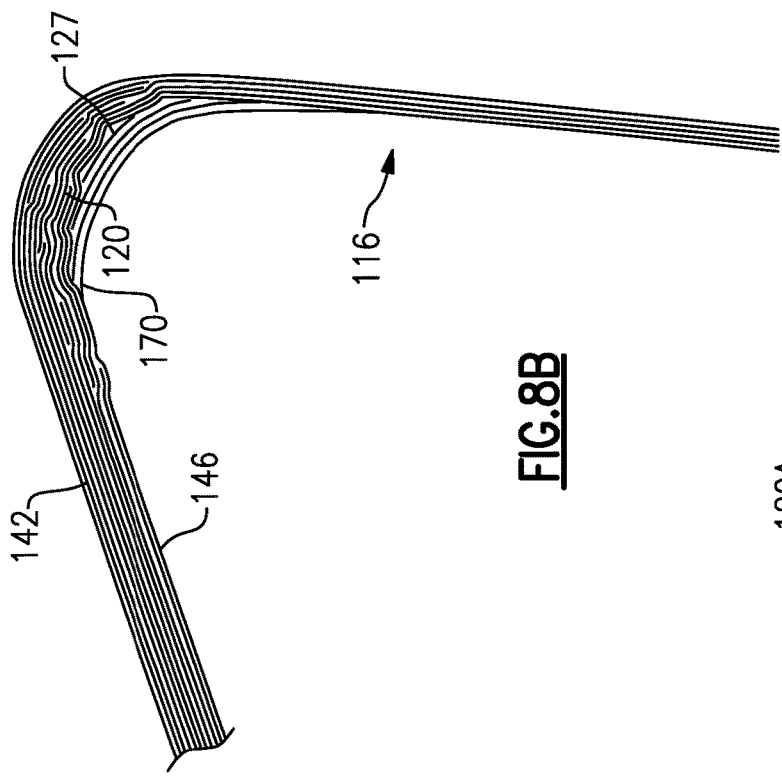
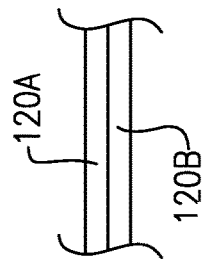
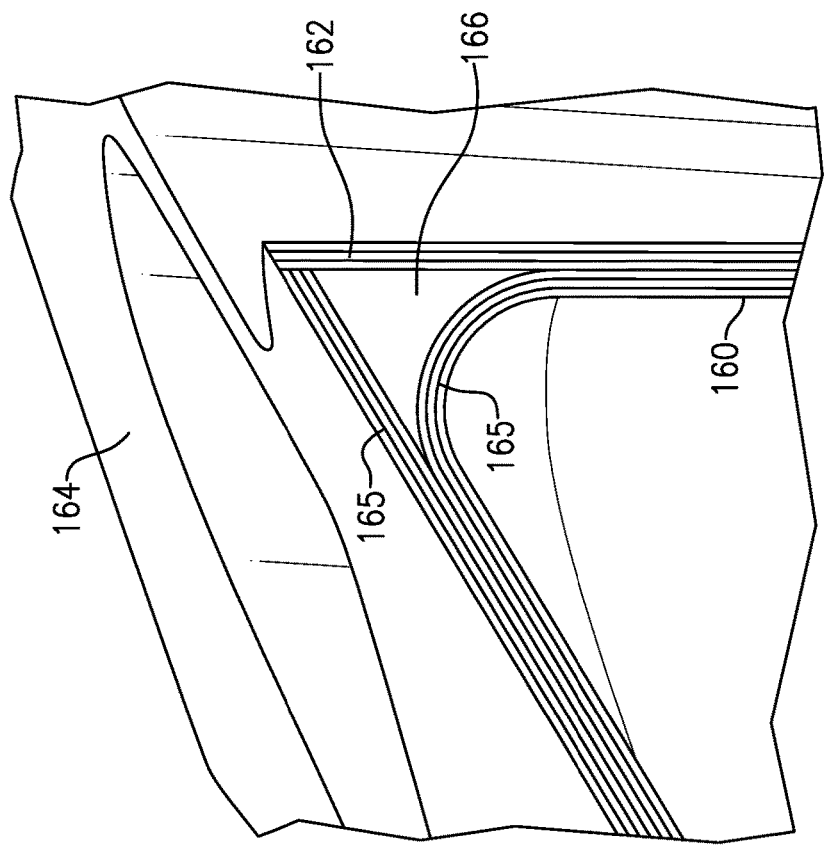
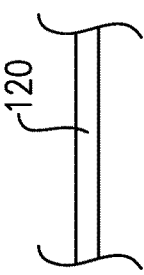
FIG.8B
FIG.9B
FIG.9A
FIG.8A
Prior Art

GAS TURBINE ENGINE COMPONENT FILLETS FORMED OF CMC PLIES

BACKGROUND

This application relates to a gas turbine engine component which is formed of ceramic matrix composite layers ("CMCs") in which a filler at the fillet between an airfoil and a platform is provided by localized plies.

Gas turbine engines are known, and typically include a propulsor delivering air as propulsion air. The propulsor also delivers air into a compressor. Air from the compressor is delivered into a combustor where it is mixed with fuel and ignited. Products of the combustion pass downstream over turbine rotors, driving them to rotate. The turbine rotors in turn drive the propulsor and compressor rotors.

It is known that the hot products of combustion raise challenges in the turbine section. Thus, it is known to utilize materials which can withstand high temperatures to form turbine section components. As an example, CMCs are proposed to form static vanes.

The CMCs are typically applied in plies, or layers. At a fillet, wherein an airfoil merges into inner and outer platforms, there is a bend which the plies do not typically fill. Solid elements called "noodles" are typically placed in the fillet to fill the space.

SUMMARY

In a featured embodiment, a gas turbine engine static vane includes a radially outer platform, a radially inner platform, and an airfoil extending between a leading edge and a trailing edge, and having a suction side and a pressure side. The radially inner and outer platforms and the airfoil all are formed of ceramic matrix composite plies. There are an outer platform fillet and an inlet platform fillet merging the airfoil into the radially outer platform and the radially inner platform and along each of the pressure side and the suction side. The fillets are formed with radially outer ply layers extending from the radially outer platform, through the airfoil, and to the radially inner platform, and radially inner ply layers extending from the radially outer platform, through the airfoil, and to the radially inner platform. The radially outer ply layers and the radially inner ply layers do not cover the entirety of the outer platform, the inner platform or the airfoil. They have edges which overlap each other such that the radially outer ply layers and radially inner ply layers include layers of different shapes.

In another embodiment according to the previous embodiment, the ply layers include filler rings at the fillets along both of the suction side and pressure side of the airfoil and at each of the inner platform and the outer platform fillets, with the filler rings extending around an entire circumference of the airfoil from the leading edge to the trailing edge, and along the pressure side and the suction side.

In another embodiment according to any of the previous embodiments, at the pressure side the ply layers also include patches of plies that extend along the pressure side in the pressure side fillet and at the outer platform, but not extending beyond the pressure side.

In another embodiment according to any of the previous embodiments, the airfoil has a hollow with the filler rings surrounding the hollow.

In another embodiment according to any of the previous embodiments, there are a plurality of filler rings in each of the fillets and at each of the radially inner and outer platforms.

In another embodiment according to any of the previous embodiments, the filler rings include a single ply.

In another embodiment according to any of the previous embodiments, the filler rings include a plurality of plies compressed together In another embodiment according to any of the previous embodiments, the airfoil, the inner platform and the outer platform are separated into a plurality of distinct zones, and the different shapes of the radially outer ply layers and radially inner ply layers are designed to include at least a plurality of zones covered by each of the different shapes.

In another featured embodiment, a gas turbine engine includes a propulsor for delivering propulsion air and for delivering air into a compressor. The compressor is connected to deliver compressed air into a combustor. The combustor is configured to receive fuel and the compressed air and ignite the mixture. The combustor is connected to pass products of combustion downstream over a turbine section. The turbine section includes rotating turbine blade and static vanes. The static vanes include a radially outer platform, a radially inner platform, and an airfoil extending between a leading edge and a trailing edge, and having a suction side and a pressure side. The radially inner and outer platforms and the airfoil all being formed of ceramic matrix composite plies. There are an outer platform fillet and an inlet platform fillet merging the airfoil into the radially outer platform and the radially inner platform and along each of the pressure side and the suction side. The fillets are both formed along a curve with the fillets formed with radially outer ply layers extending from the radially outer platform, through the airfoil, and to the radially inner platform, and radially inner ply layers extending from the radially outer platform, through the airfoil, and to the radially inner platform. The radially outer ply layers and the radially inner ply layers do not cover the entirety of the outer platform, the inner platform or the airfoil, and have edges which overlap each other such that the radially outer ply layers and radially inner ply layers include layers of different shapes.

In another embodiment according to any of the previous embodiments, the ply layers include filler rings at the fillets along both of the suction side and pressure side of the airfoil and at each of the inner platform and the outer platform fillets, with the filler rings extending around an entire circumference of the airfoil from the leading edge to the trailing edge, and along the pressure side and the suction side.

In another embodiment according to any of the previous embodiments, at the pressure side the ply layers also include patches of plies that extend along the pressure side in the pressure side fillet and at the outer platform, but not extending beyond the pressure side.

In another embodiment according to any of the previous embodiments, the airfoil has a hollow with the filler rings surrounding the hollow.

In another embodiment according to any of the previous embodiments, there are a plurality of filler rings in each of the fillets between the pressure side and the suction side and at each of the radially inner and outer platforms.

In another embodiment according to any of the previous embodiments, the filler rings include a single ply.

In another embodiment according to any of the previous embodiments, the filler rings include a plurality of plies compressed together.

In another embodiment according to any of the previous embodiments, the airfoil, the inner platform and the outer platform are separated into a plurality of distinct zones, and the different shapes of the radially outer ply layers and radially inner ply layers are designed to include at least a plurality of zones covered by each of the different shapes.

In another featured embodiment, a method of forming a gas turbine engine static vane includes the steps of providing a shear tube defining an inner surface of an airfoil, and placing radially outer ply layers around the shear tube. The radially outer ply layers extend to provide a portion of a radially outer platform, through an airfoil defined by the shear tube, and to define a radially inner platform. The radially outer platform and radially inner platform connect into the airfoil through curved fillets. Placing radially inner ply layers extending to partially define a radially outer platform, through the airfoil, and to partially define the radially inner platform. The radially outer ply layers and the radially inner ply layers do not cover the entirety of the platform or the inner platform, or the airfoil, and have edges which overlap each other such that the radially outer ply layers and radially inner ply layers include layers of different shapes.

In another embodiment according to any of the previous embodiments, includes the step of placing filler rings in the fillets along both of the suction side and pressure side of the airfoil and at each of the inner platform and outer platform fillets, with the filler rings extending around an entire circumference of the airfoil from the leading edge to the trailing edge, and along the pressure side and the suction side.

In another embodiment according to any of the previous embodiments, includes the step of placing patches of plies that extend along the pressure side in the pressure side fillet and at the outer platform, but not extending beyond the pressure side.

In another embodiment according to any of the previous embodiments, the airfoil, the inner platform and the outer platform are separated into a plurality of distinct zones, and the different shapes of the radially outer ply layers and radially inner ply layers are designed to include at least a plurality of zones covered by each of the different shapes.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 7A shows a prior art method of filling space at a fillet at a suction side of the airfoil.
FIG. 7B shows the filling of the suction side fillet area under this disclosure.
FIG. 8A shows a prior art fillet at a pressure side of the airfoil.
FIG. 8B shows the filling of the pressure side fillet area under this disclosure.
FIG. 9A shows a first filler embodiment.
FIG. 9B shows an alternative filler embodiment.

DETAILED DESCRIPTION

Figure 1:
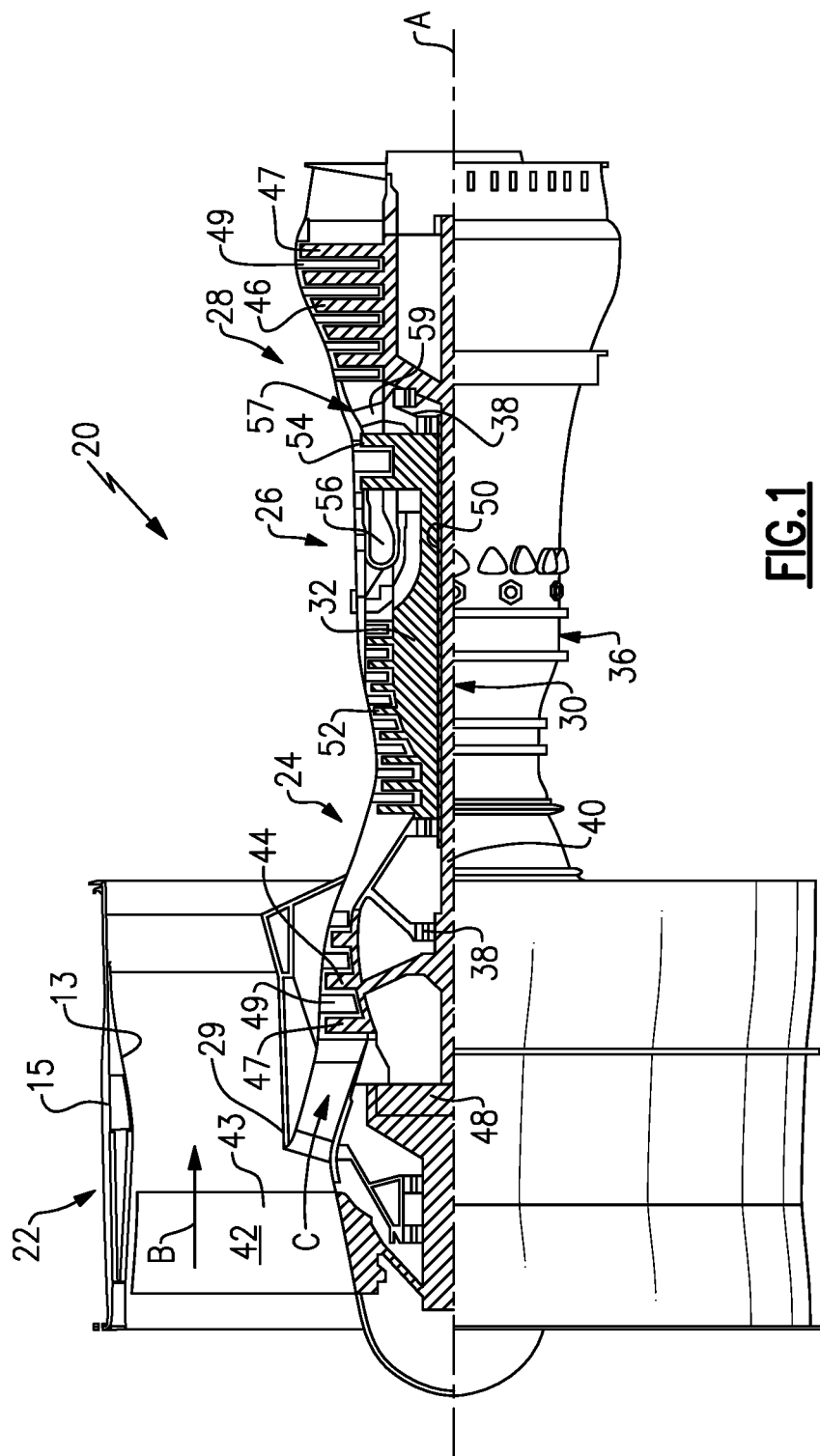
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40.

"Corrected fan tip speed" is the actual fan tip speed in ft/sec divided by an industry standard temperature correction of [(Tram ° R)/(518.7° R)]$^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
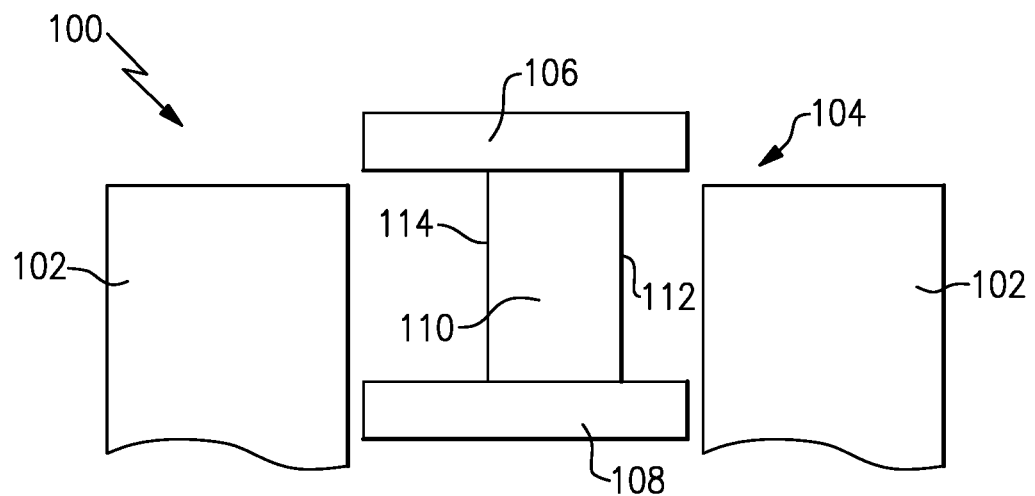
FIG. 2 schematically shows a turbine section.

FIG. 2 schematically shows a turbine section 100 which may be found in the engine of FIG. 1. As shown, rotating turbine blades 102 are separated by a static vane 104. Vane 104 has an outer platform 106 and an inner platform 108. An airfoil 110 connects platforms 106 and 108. Airfoil 110 has a leading edge 114 and a trailing edge 112. Airfoil 110 has a pressure side 85 and suction side 86.

Figure 3:
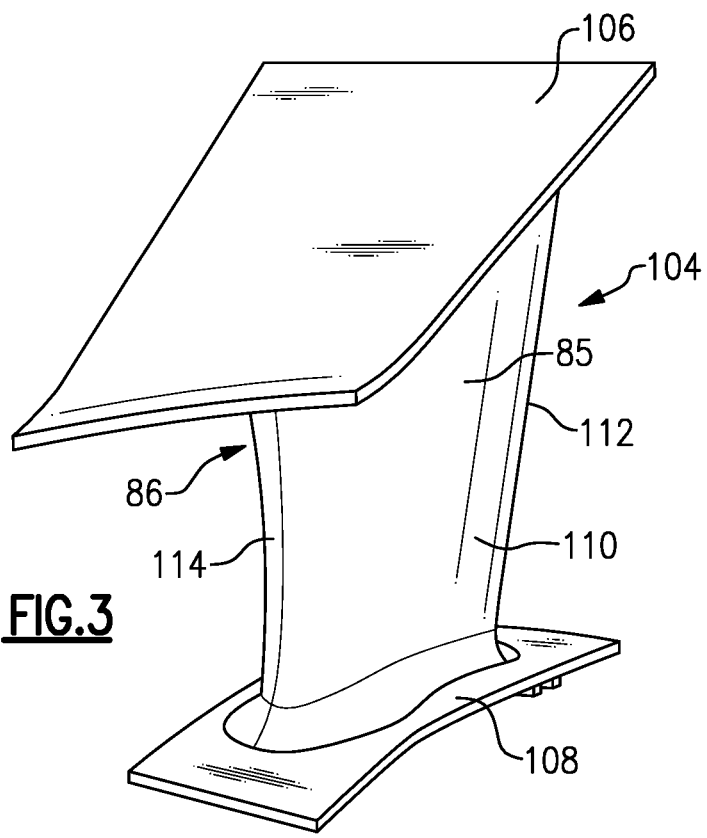
FIG. 3 shows a static vane in the turbine section of FIG. 2.

FIG. 3 shows a vane 104 with airfoil 110 and platforms 106 and 108.

Vane 104 is formed of ceramic matrix composites.

A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure.

In the prior art it is known to form a shear tube on a mandrel to provide an interior base and shape of an internal cavity for the vane. CMC fabric layers are then placed outward of the shear tube. Curved fillets are formed to connect the airfoil to the inner and outer platforms formed by the fabric layers. Due to limitations on the amount of bend that can be achieved with the fabric layers, there have typically been voids in the fillet that are filled with so-called noodles. It would be desirably to eliminate the noodles.

Thus, this disclosure proposes a method to build up the entire vane including the fillets utilizing multiple overlapping layers. Further, the layers are of different shapes, and thus have interweaved portions. Preferably some of the layers are made as large as possible to minimize the number of ply drop-offs in the final vane.

Figure 4A:
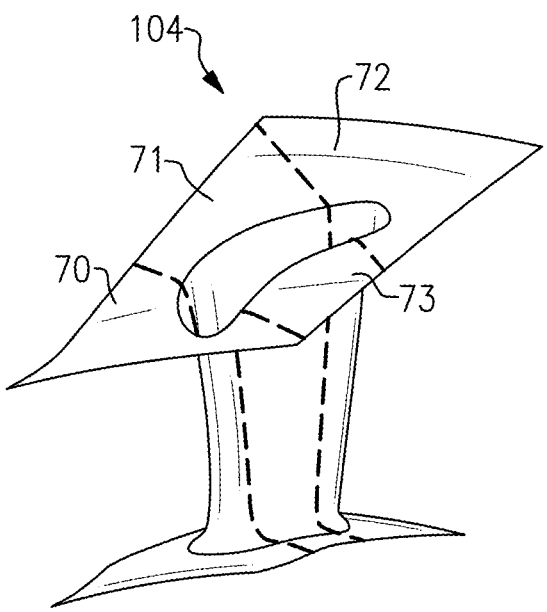
FIG. 4A shows a formation scheme according to one embodiment of this disclosure.

FIG. 4A shows a scheme for forming a vane 104 wherein there are four zones or sections 70, 71, 72 and 73.

Figure 4B:
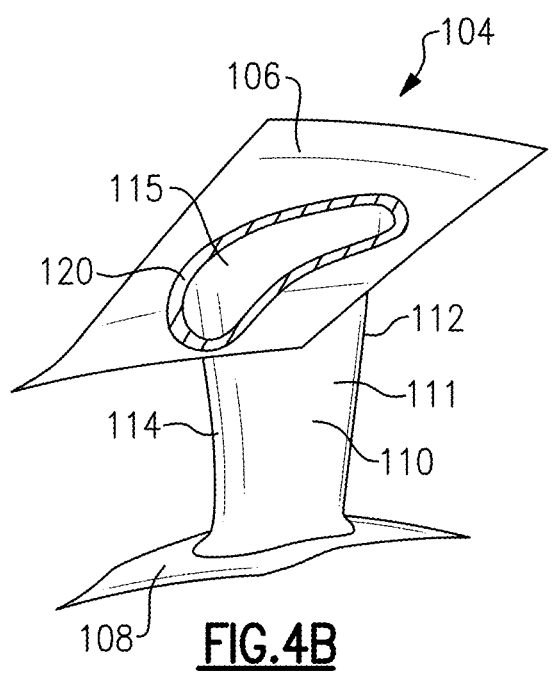
FIG. 4B shows a first ply ring which is incorporated into a static vane according to this disclosure.

FIG. 4B shows a component that is incorporated in the vane 104. A filler ply 120 is included at the radially outer platform 106. The filler ply 120 extends around an entire circumference of the airfoil 110, including extending between the leading edge 114 and the trailing edge 112 along both a pressure side 111 and a suction side 113 and thus may be called a filler ring. In practice there could be plural plies in filler ring 120, say four.

The airfoil has a hollow 115 with the filler ring 120 surrounding the hollow 115.

Figure 4C:
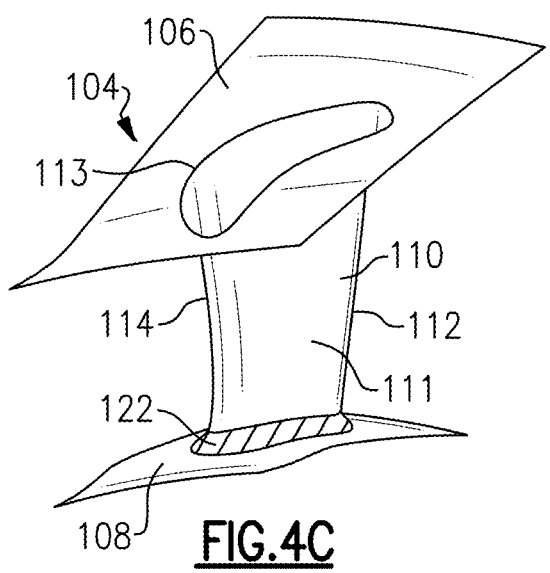
FIG. 4C shows a second ply ring.

FIG. 4C shows a similar filler ring 122 at the radially inner platform 108.

Again, it extends around the entire circumference of the airfoil, from the leading edge 114 to the trailing edge 112 and thus may be called a filler ring.

In practice there could be plural plies in filler rings 120 and 122, say four.

Figure 4D:
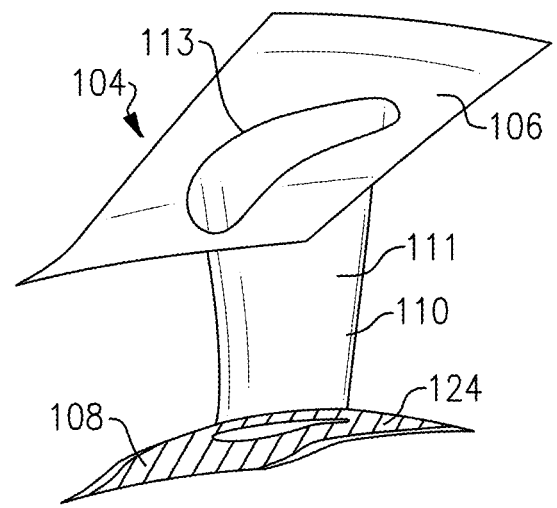
FIG. 4D shows another ply layer.

FIG. 4D shows another ply 124 received at the inner platform 108, and covering the bulk of the inner platform. Again, there can be plural plies 124, say six.

Figure 4E:
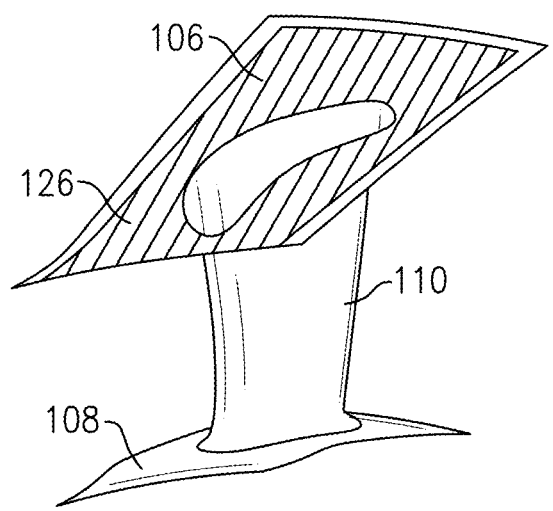
FIG. 4E shows yet another ply layer.

FIG. 4E shows a similar layer 126 at the radially outer platform 106, and which will be outwardly of the filler ring 120. Again, there can be plural plies 126, say six.

Figure 4F:
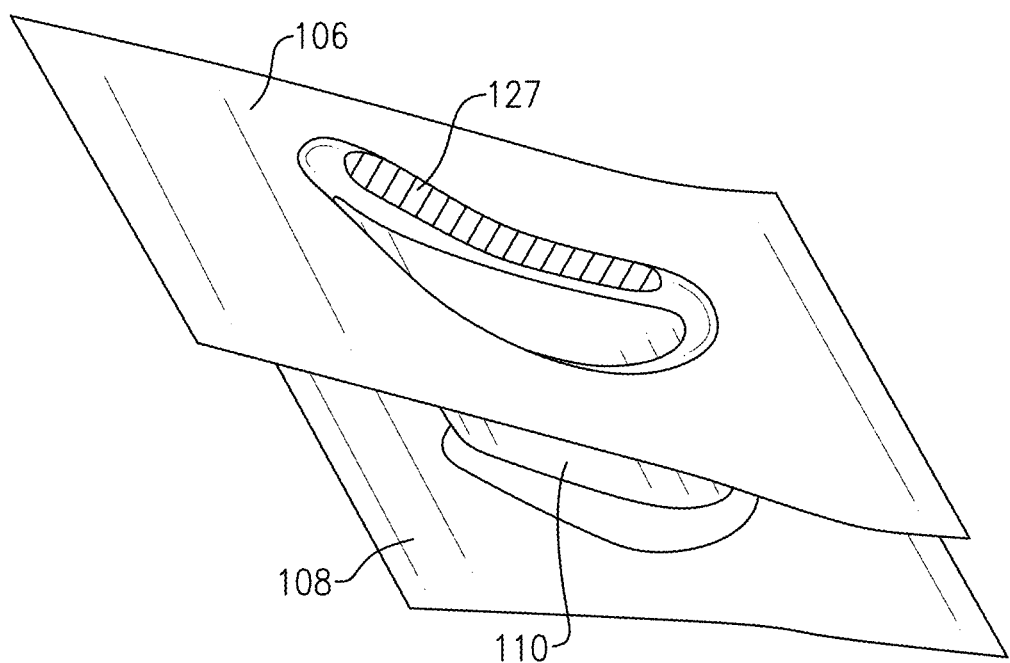
FIG. 4F shows yet another ply patch.

FIG. 4F shows a filler patch 127 which is utilized on the pressure side of the airfoil 110. While it is shown at the radially outer platform 106, a similar filler patch may be utilized at the radially inner platform 108 if needed as described below. Patch 127 may be formed of plural plies, say nine.

The filler patch 127 does not extend beyond the leading edge or the trailing edge at the pressure side.

Figure 4G:
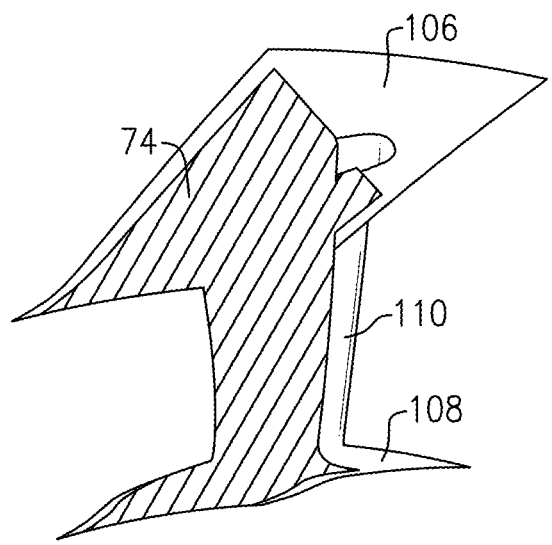
FIG. 4G shows yet another ply layer.

FIG. 4G shows what may be thought of as a main ply 74 that defines a portion of the inner and outer platforms 106 and 108 and extends through the airfoil 110.

Figure 4H:
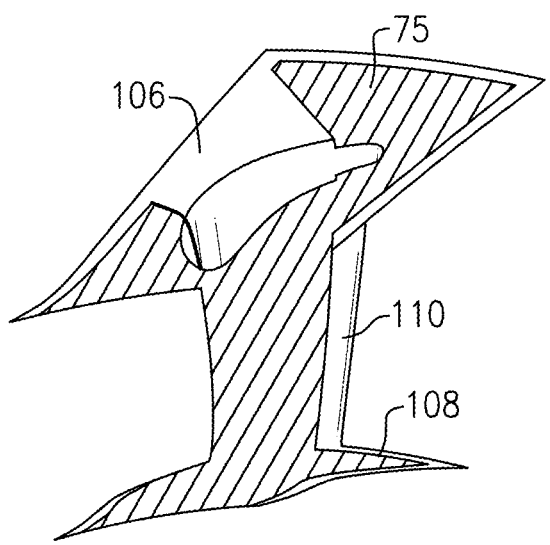
FIG. 4H shows yet another ply layer.

FIG. 4H shows another main ply 75. As can be appreciated, main ply 75 has some overlap with main ply 74, but also covers additional area.

Figure 4I:
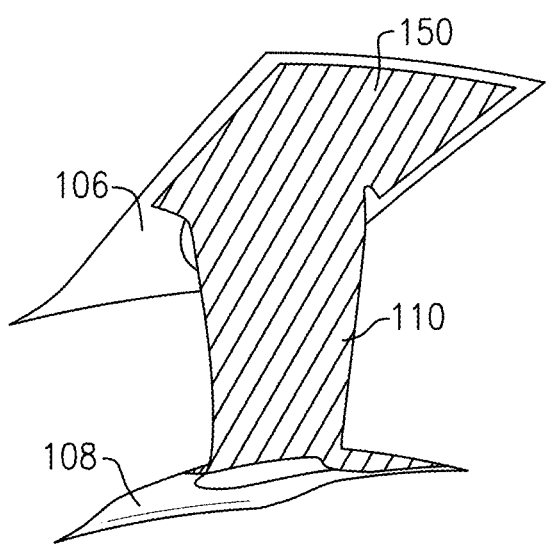
FIG. 4I shows yet another ply layer.

FIG. 4I shows yet another main ply 150 which also would overlap with a portion of main plies 74 and 75.

Figure 4J:
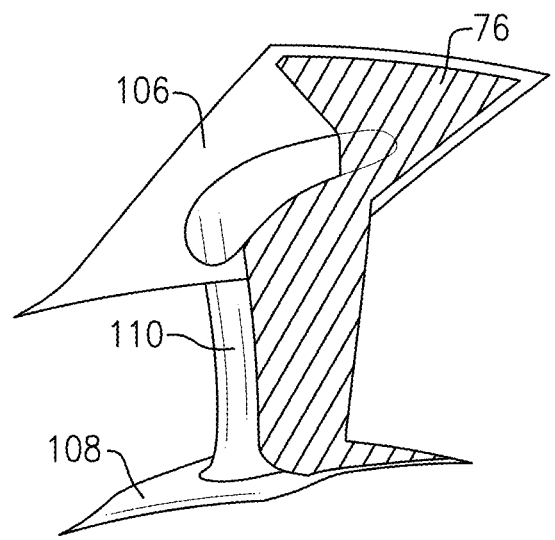
FIG. 4J shows yet another ply layer.

Similarly, FIG. 4J shows yet another main ply 76.

Figure 4K:
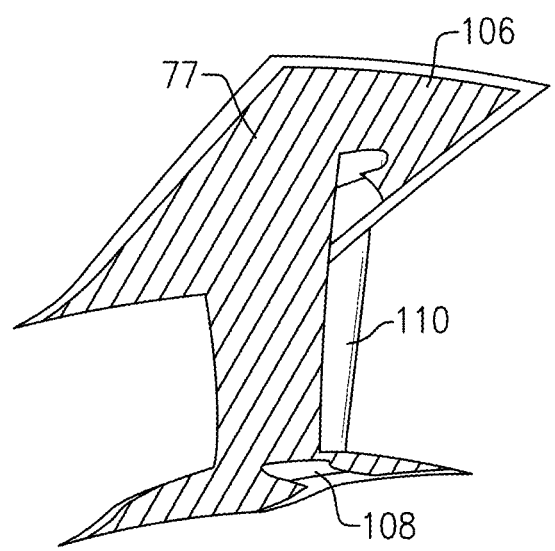
FIG. 4K shows yet another ply layer.

FIG. 4K shows yet another main ply 77.

Figure 4M:
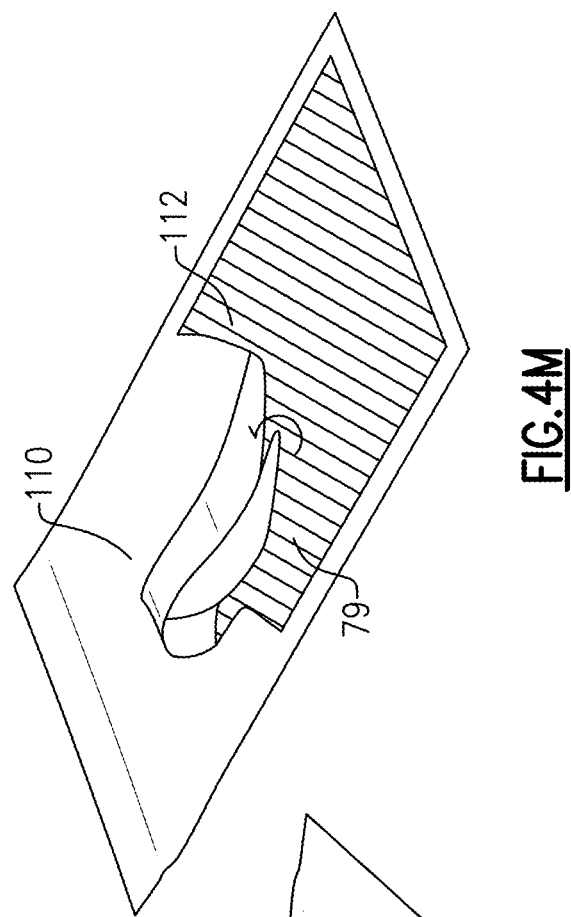
FIG. 4M shows yet another ply layer.
Figure 4L:
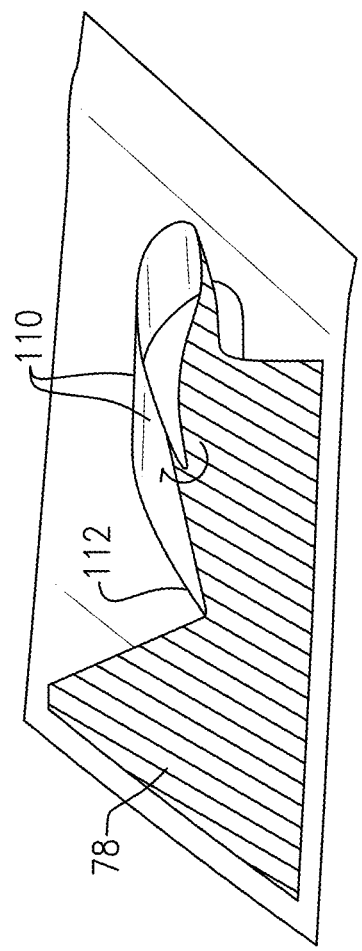
FIG. 4L shows yet another ply layer.

FIG. 4L shows yet another main ply 78 that wraps around the trailing edge and towards the leading edge 112.

FIG. 4M shows yet another main ply 79 that overlaps ply 78.

Each of the main plies shown in FIGS. 4G-4M cover a plurality of the zones shown in FIG. 4A. However, each of them cover distinct combinations of the zones such that there is overlap. It could be said that edges of the plies are thus interleaved with other shaped plies covering other combinations of the zones.

For each of the FIGS. 4B-4M shapes one or two plies may be used, but other numbers of plies could be used under this disclosure.

It should be understood that while FIG. 4A shows four zones, other numbers of zones could be utilized.

Figure 5:
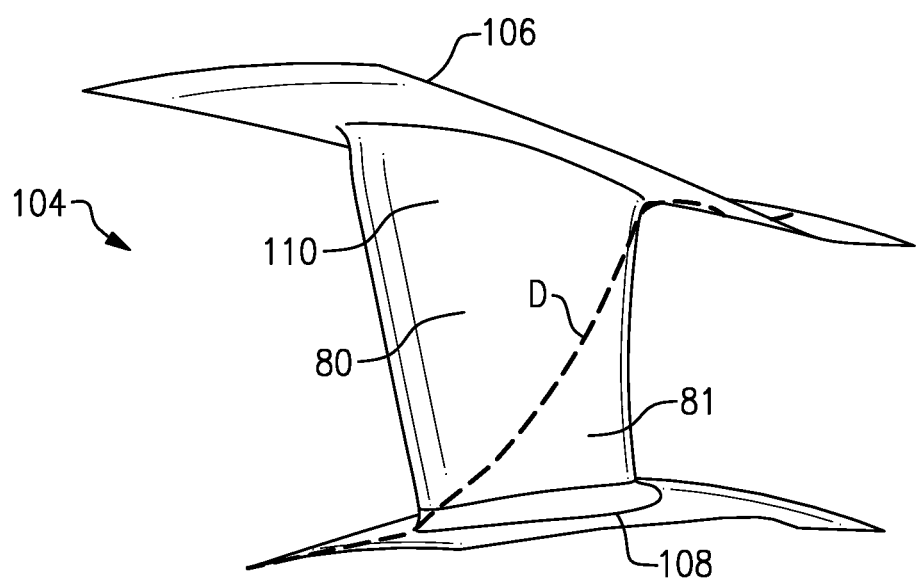
FIG. 5 shows another formation scheme.

FIG. 5 shows a zone construction wherein the sections of the vane 104 include a leading edge zone 80 and a trailing edge zone 81 which are generally separated by a diagonal D.

Figure 6A:
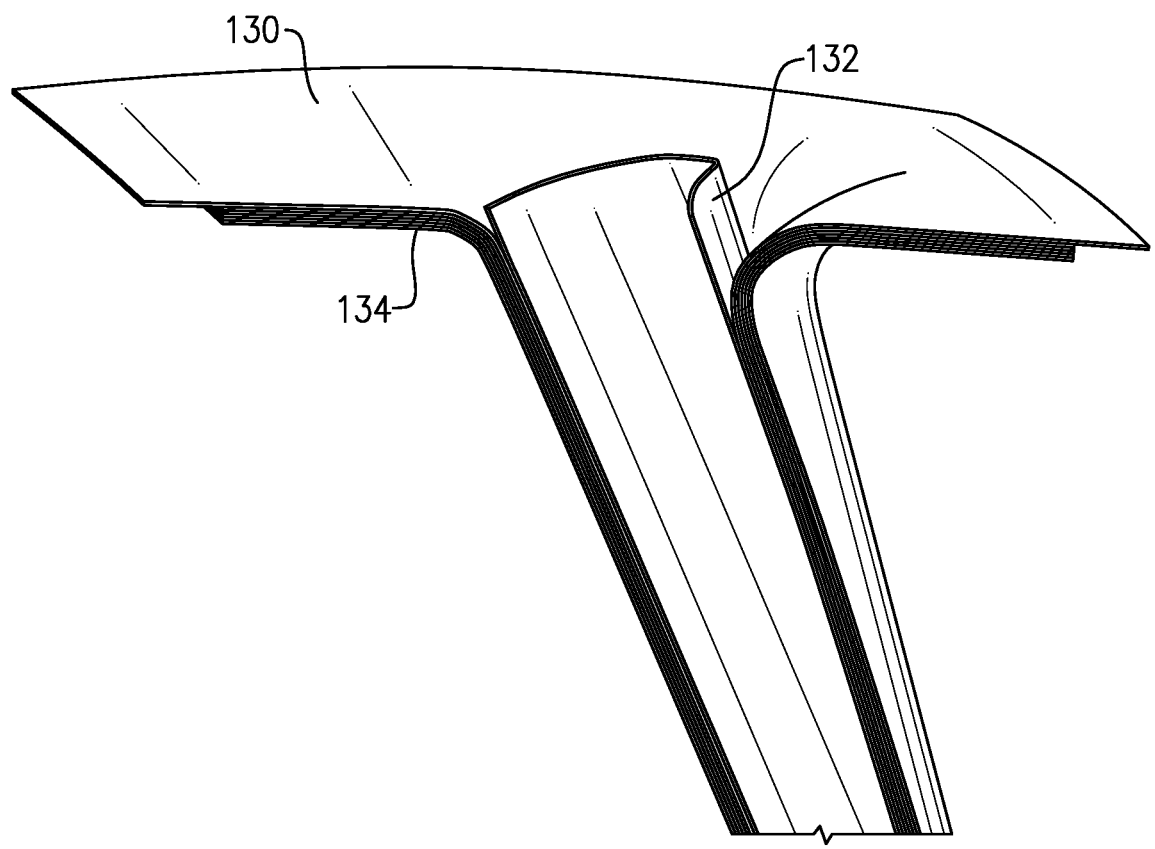
FIG. 6A shows a layup to form the vane according to this disclosure.

FIG. 6A shows the buildup of the airfoil, including a mold surface 130. A shear tube 132 is positioned within an opening in the mold surface 130. Plies 134 are positioned outwardly of the mold surface 130, as will be described in more detail below. Plies 134 may include plies as shown in FIGS. 4B-4M.

It should be understood that methods of building up the vane other than using a shear tube will benefit under this disclosure.

Figure 6B:
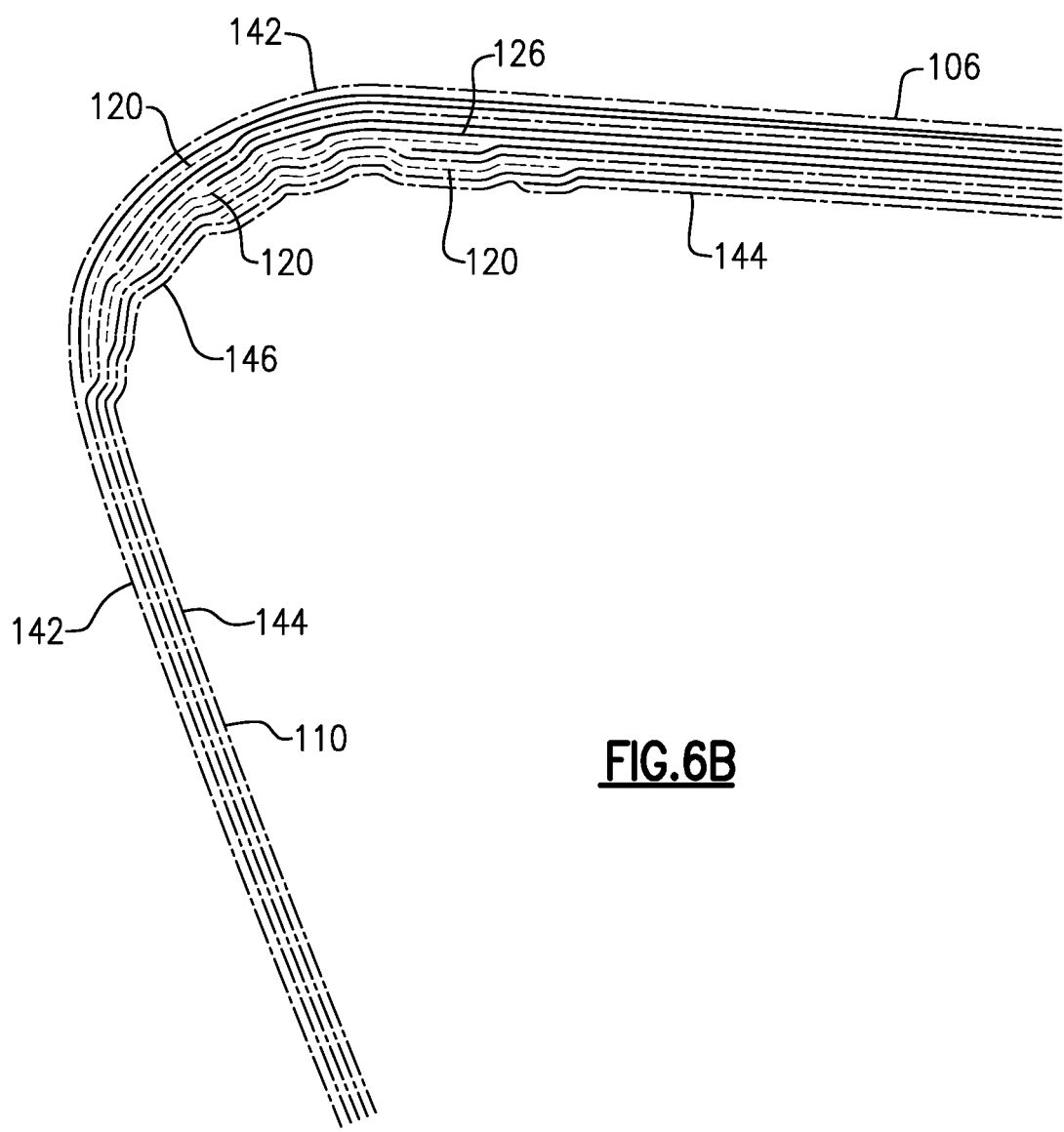
FIG. 6B shows an example fillet.

FIG. 6B shows an example fillet which connects the airfoil 110 to the radially outer platform 106. As shown, the filler rings 120 are positioned between radially inner plies 146 and radially outer plies 142. Plies 144 and 142 extend from the outer platform 106 through the airfoil 110 and may extend to the radially inner platform also. The filler rings 120 do not. Rather, the filler rings 120 are concentrated in the fillet area 146.

Note, that the several filler rings 120 end at distinct locations which are offset, or staggered, relative to each other. This performs the function of improved integration and tailoring to meet a target profile. Other plies also overlap each other or have interleaved ends. Again the plies may be shaped as shown in FIGS. 4G-4M. As can be seen the fillet is filled entirely with plies. No noodle is required.

A similar structure would be found at the fillet connecting the inner platform 108 to the airfoil 110.

There are a plurality of filler rings 120/122 at each of the fillets between the pressure side and the suction side and each of the radially inner and outer platforms.

FIG. 7A shows a prior fillet 152 at a suction side of a vane. There are radially inner layer plies 152 leading from the airfoil into the outer platform 158 and radially outer plies 150. An intermediate noodle 154 is formed of a solid part. In some embodiments, the noodle may have been formed of unidirectional fiber tows densified with ceramic matrix.

As can be seen, the outer surface ply layers 150 abut airfoil ply layers 300. The abutting surfaces raise challenges with regard to handling operational stresses.

FIG. 7B shows a suction side filler 146 at the outer platform 106 in a disclosed vane. As shown, there is an obtuse angle between the platform 106 and the airfoil 110. Thus, the area that would be filled by the noodle 154 is relatively small. The space can be filled by the filler rings 120 and the other plies. As shown, the filler rings 120 may be radially spaced from each other, with radially inner plies 144 and radially outer plies 142 extending from the platform 106, through the airfoil 110. Again, the filler rings 120 do not extend this entire distance, but rather end adjacent fillet 146.

As can be appreciated, the curved fillet shown in FIG. 7B does not have the abutting surfaces, but rather is formed by curved overlapping ply layers. This structure is better able to handle the operational stresses than the FIG. 7A structure. The same is true with the FIG. 8B structure described below.

Also, ends of filler rings 120 do not overlap, but are offset. The inner platform 108 have similar structure with filler rings 122 at the suction side.

FIG. 8A shows a prior art vane at the pressure side. Here, there is an acute angle between the outer platform 164 and the airfoil 160. Thus, the noodle 166 that fills the space between layers 162, 163 and 165 is relatively large compared to the FIG. 7A noodle 154.

As shown in FIG. 8B, the fillet 170 in the disclosed vane includes the radially inner and outer layers 142 and 146, as well as the filler rings 120 at the fillet 170. However, the filler patch 127 is also included.

Returning to FIG. 4E, one can see the filler patch does not extend outwardly of the pressure side.

Inner platform 108 will have similar structure at the pressure side.

In practice, the fillets between the airfoil 110 and the inner platform 108 at both the suction side and pressure side may be of a size intermediate to the two at the outer platform 106.

FIG. 9A shows a feature that may be true of both the filler rings and the filler patch 127, although illustrated with regard to the filler ring 120. As shown in FIG. 9A, the filler ring 120 may be a single ply.

However, in another embodiment shown in FIG. 9B, there may be a plurality of plies 120A and 120B which are compressed together prior to incorporation into the overall vane to provide the filler ring 120.

A gas turbine engine static vane under this disclosure could be said to include a radially outer platform, a radially inner platform, and an airfoil extending between a leading edge and a trailing edge, and having a suction side and a pressure side. The radially inner and outer platforms and the airfoil all are formed of ceramic matrix composite plies. There are outer platform fillets and inlet platform fillets merging the airfoil into the radially outer platform and the radially inner platform and at each of the pressure side and the suction side. The fillets are formed with radially outer ply layers extending from the radially outer platform, through the airfoil, and to the radially inner platform. Radially inner ply layers extend from the radially outer platform, through the airfoil, and to the radially inner platform. None of the radially outer ply layers and the radially inner ply layers-de not cover the entirety of the platform or the inner platform, or the airfoil. They have edges which overlap each other such that the radially outer ply layers and radially inner ply layers include layers of different shapes.

A method of forming a gas turbine engine static vane includes the steps of providing a shear tube defining an inner surface of an airfoil, and placing radially outer ply layers around the shear tube. The radially outer ply layers extend to provide a portion of a radially outer platform, through an airfoil defined by the shear tube, and to define a radially inner platform. Radially inner ply layers are placed extending to partially define a radially outer platform, through the airfoil, and to partially define the radially inner platform. None of the radially outer ply layers and the radially inner ply layers cover the entirety of the platform or the inner platform, or the airfoil. They have edges which overlap each other such that the radially outer ply layers and radially inner ply layers include layers of different shapes.

An embodiment has been disclosed, however, a worker of ordinary skill in this art would recognize that modifications would come within the scope of this disclosure. For that reason, the following claims should be studied to determine the true scope and content of this disclosure.

What is claimed is:

1. A gas turbine engine static vane comprising:
a radially outer platform, a radially inner platform, and an airfoil extending between a leading edge and a trailing edge, and having a suction side and a pressure side;
the radially inner and outer platforms and the airfoil all being formed of ceramic matrix composite plies, and there being an outer platform fillet and an inlet platform fillet merging the airfoil into the radially outer platform and the radially inner platform and along each of the pressure side and the suction side, with the fillets formed with radially outer ply layers extending from the radially outer platform, through the airfoil, and to the radially inner platform, and radially inner ply layers extending from the radially outer platform, through the airfoil, and to the radially inner platform; and
wherein none of the radially outer ply layers and the radially inner ply layers cover the entirety of the radially outer platform, the radially inner platform or the airfoil, and have edges which overlap each other such that the radially outer ply layers and radially inner ply layers include layers of different shapes.

2. The gas turbine engine static vane as set forth in claim 1, wherein the radially outer and radially inner ply layers include filler rings at the fillets along both of the suction side and pressure side of the airfoil and at each of the inner platform and the outer platform fillets, with the filler rings extending around an entire circumference of the airfoil from the leading edge to the trailing edge, and along the pressure side and the suction side.

3. The gas turbine engine static vane as set forth in claim 2, wherein at the pressure side the radially outer and radially inner ply layers also include patches of plies that extend along the pressure side in the pressure side fillet and at the radially outer platform, but not extending beyond the pressure side.

4. The gas turbine engine static vane as set forth in claim 2, wherein the airfoil has a hollow with the filler rings surrounding the hollow.

5. The gas turbine engine static vane as set forth in claim 4, wherein there are a plurality of filler rings in each of the outer and inner platform fillets and at each of the radially inner and outer platforms.

6. The gas turbine engine static vane as set forth in claim 2, wherein the filler rings include a single ply.

7. The gas turbine engine static vane as set forth in claim 2, wherein the filler rings include a plurality of plies compressed together.

8. The gas turbine static vane as set forth in claim 1, wherein the airfoil, the radially inner platform and the radially outer platform are separated into a plurality of distinct zones, and the different shapes of the radially outer ply layers and radially inner ply layers are designed to include at least a plurality of zones covered by each of the different shapes.

9. A gas turbine engine comprising:
a propulsor for delivering propulsion air and for delivering air into a compressor, the compressor connected to deliver compressed air into a combustor, the combustor configured to receive fuel and the compressed air and ignite a mixture of the fuel and compressed air, and the combustor connected to pass products of combustion downstream over a turbine section, the turbine section including rotating turbine blade and static vanes;
the static vanes including:
a radially outer platform, a radially inner platform, and an airfoil extending between a leading edge and a trailing edge, and having a suction side and a pressure side;
the radially inner and outer platforms and the airfoil all being formed of ceramic matrix composite plies, and there being an outer platform fillet and an inlet platform fillet merging the airfoil into the radially outer platform and the radially inner platform and along each of the pressure side and the suction side, the fillets both formed along a curve with the fillets formed with radially outer ply layers extending from the radially outer platform, through the airfoil, and to the radially inner platform, and radially inner ply layers extending from the radially outer platform, through the airfoil, and to the radially inner platform; and
wherein none of the radially outer ply layers and the radially inner ply layers cover the entirety of the radially outer platform, the radially inner platform or the airfoil, and have edges which overlap each other such that the radially outer ply layers and radially inner ply layers include layers of different shapes.

10. The gas turbine engine as set forth in claim 9, wherein the radially outer and radially inner ply layers include filler rings at the fillets along both of the suction side and pressure side of the airfoil and at each of the inner platform and the outer platform fillets, with the filler rings extending around an entire circumference of the airfoil from the leading edge to the trailing edge, and along the pressure side and the suction side.

11. The gas turbine engine as set forth in claim 10, wherein at the pressure side the radially outer and radially inner ply layers also include patches of plies that extend along the pressure side in the pressure side fillet and at the radially outer platform, but not extending beyond the pressure side.

12. The gas turbine engine as set forth in claim 10, wherein the airfoil has a hollow with the filler rings surrounding the hollow.

13. The gas turbine engine as set forth in claim 10, wherein there are a plurality of filler rings in each of the outer and inner platform fillets between the pressure side and the suction side and at each of the radially inner and outer platforms.

14. The gas turbine engine as set forth in claim 10, wherein the filler rings include a single ply.

15. The gas turbine engine as set forth in claim 10, wherein the filler rings include a plurality of plies compressed together.

16. The gas turbine engine as set forth in claim 9, wherein the airfoil, the radially inner platform and the radially outer platform are separated into a plurality of distinct zones, and the different shapes of the radially outer ply layers and radially inner ply layers are designed to include at least a plurality of zones covered by each of the different shapes.

17. A method of forming a gas turbine engine static vane comprising the steps of:
providing a shear tube defining an inner surface of an airfoil, and placing radially outer ply layers around the shear tube, with the radially outer ply layers extending to provide a portion of a radially outer platform, through an airfoil defined by the shear tube, and to define a radially inner platform;
the radially outer platform and radially inner platform connect into the airfoil through curved fillets;

placing radially inner ply layers extending to partially define a radially outer platform, through the airfoil, and to partially define the radially inner platform, and wherein none of the radially outer ply layers and the radially inner ply layers cover the entirety of the radially outer platform or the radially inner platform, or the airfoil, and have edges which overlap each other such that the radially outer ply layers and radially inner ply layers include layers of different shapes.

18. The method as set forth in claim 17, including the step of placing filler rings in the fillets along both of the suction side and pressure side of the airfoil and at each of the inner platform and outer platform fillets, with the filler rings extending around an entire circumference of the airfoil from the leading edge to the trailing edge, and along the pressure side and the suction side.

19. The method as set forth in claim 18, including the step of placing patches of plies that extend along the pressure side in the pressure side fillet and at the radially outer platform, but not extending beyond the pressure side.

20. The method as set forth in claim 9, wherein the airfoil, the radially inner platform and the radially outer platform are separated into a plurality of distinct zones, and the different shapes of the radially outer ply layers and radially inner ply layers are designed to include at least a plurality of zones covered by each of the different shapes.

* * * * *